May 2, 1961 A. V. L. C. DEBRIE 2,982,171

APPARATUS FOR CONTINUOUS TELEVISION AND NON-CONTINUOUS PHOTOGRAPHY ON FILM WITH A CAMERA HAVING A SINGLE OBJECTIVE

Filed Dec. 11, 1957

INVENTOR.
Andre Victor Leon Clement Debrie
BY Michael S. Striker
Attorney

United States Patent Office 2,982,171 Patented May 2, 1961

2,982,171

APPARATUS FOR CONTINUOUS TELEVISION AND NON-CONTINUOUS PHOTOGRAPHY ON FILM WITH A CAMERA HAVING A SINGLE OBJECTIVE

André Victor Léon Clément Debrie, 111 Rue Saint-Maur, Paris, France

Filed Dec. 11, 1957, Ser. No. 702,182

Claims priority, application France Jan. 16, 1957

8 Claims. (Cl. 88—16)

The invention relates to cameras which record cinematographic scenes on film and which simultaneously ensure the transmission of the scenes by television, with the same lens system.

In order to divide the beam of rays, it is known to use semi-reflecting devices having semi-transparent surfaces carried by a sheet with parallel faces or by the diagonal plane of a transparent cube.

These devices have optical disadvantages and are little, if at all, suited for use with wide-aperture objectives which tend to be frequently employed at the present time.

They absorb light from the cinematographic beam and give a continuous illumination of the television cell which receives the images, such continuous illumination being troublesome with the non-continuous transmission devices used, and which have a certain illumination hysteresis which itself is furthermore advantageous. With these devices, the cinematographic shutter is normal, using a rotating segment. It has also been proposed to use rotating shutters having reflecting shutter surfaces and with an inclined axis, these shutters being common to the cinematographic recording of the strips and to the periodic interruption of the image on the television analyser.

In the case of devices having rotating reflector-shutters, particular difficulties appear when, as is the current practice, a number of mixed cameras are used, with or without operators, in which cameras the images are received by television at the control desk which enables the images transmitted to the public by television and the images to be recorded on film to be selected at the will of the controlling operator.

In the case of images recorded on film, the continuous recording, with marking of selected images to facilitate the final mounting, or the single recording of selected scenes, without stopping the corresponding camera, lead to a useless expenditure of film, which is multiplied by the number of cameras controlled.

If it is desired to reduce this expense, it becomes necessary to stop each camera for the duration of the non-selected scenes, the selected scenes only being taken, without losing practically any film between each scene on the same film.

Up to the present time however, the stopping of the cinematographic mechanism of the camera also involved the stoppage of the reflecting shutter, which must be stopped in a position of reflection towards the television analyser, and the latter thus receives an abnormal continuous illumination.

In addition, for each re-starting of the recording on film, it is necessary again to ensure synchronism and bringing about phase agreement between the shutter which has been re-started and the scanning system of the television.

The reflections of the image towards the television analyser should, according to the current norms, be made at a frequency of 50 per second, the frequency of exposure on film being 25 per second.

The double frequency for television can be obtained by using a single rotating shutter having two opposite non-transparent reflecting sectors for television, one of the two sectors together with adjoining opaque non-reflecting sectors providing the shutter effect during the movement of the film, this combined sector having normally a less wide angle than the remaining transparent sector which does not correspond to this time of translatory movement. The two reflecting sectors face the objective and are both of equal angular magnitude.

The passage of the second reflecting sector during the time of exposure of the film, motionless in the beam of light, only introduces a division of the total exposure time in two parts, which in practice does not give any trouble.

The disadvantages of stopping a shutter of this kind still exist.

The present invention has for its object to obviate these drawbacks.

It consists essentially, in a photographic camera having a single lens system, equipped for the transmission of images by television and for the simultaneous recording of cinematographic images on film, in arranging at least one shutter controlling in synchronism and in phase with the television analyser, the formation on the television screen of the images transmitted by the objective, in maintaining this shutter in continuous rotation during the entire period of photography, and which remains in synchronism and in phase with the said analyser, while the travel of the film is controlled by stopping it, at the will of a control-operator who observes the televised images, during the periods in which the recording on this film is considered to be without interest, and in restoring the travel and the synchronisation of the film with the periodic shutter of the images received on the television analyser of the camera each time the said control-operator desires to make photographic recording on film by successive scenes, practically without loss of film between the selected scenes.

The accompanying drawings show very diagrammatically examples of existing practice and devices for carrying the invention into effect, in order to make the invention perfectly clear.

In these drawings, the same parts have been given the same reference numbers.

Figures 1, 4:
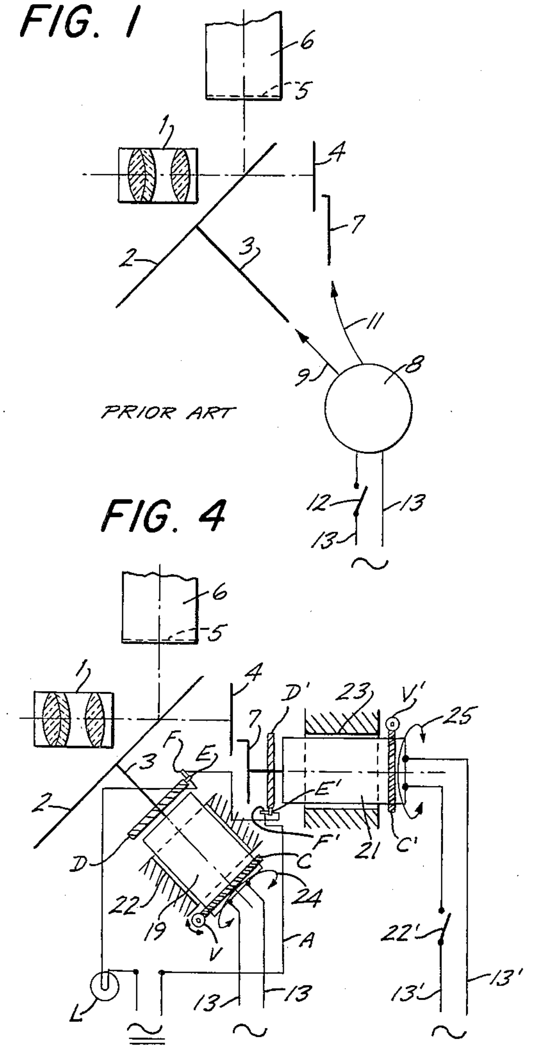
Fig. 1 is a diagram of a known device for the simultaneous transmission of television images and the recording of selected images on film.
Fig. 4 shows diagrammatically a particular device for carrying the invention into practice, with an indication of means for bringing the shutter and the forward movement of the film into phase with the television analyser.
Figure 5:
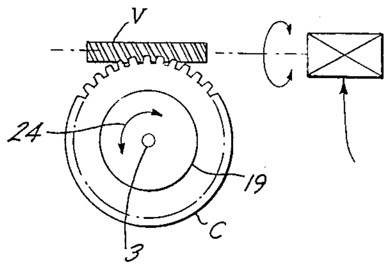
Figure 6:
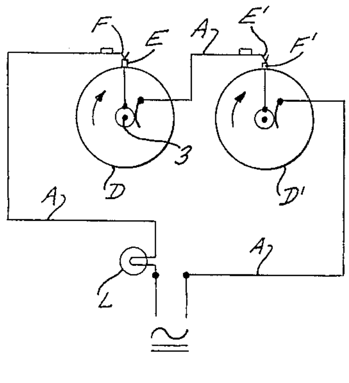

Figs. 5 and 6 diagrammatically illustrate details of the device of Fig. 4.

In the device shown diagrammatically in Fig. 1, 1 is the single objective of the camera (not shown) the beam of light of which meets the shutter 2 which rotates about the axis 3 inclined at 45° to the optical axis and to the plane of the film 4, in the image window (not shown).

When the beam is reflected by certain sectors of the shutter, it is deflected in the direction of the screen 5 of a television analyser 6 of known type, of which one part only is shown in diagrammatic form.

The film 4 and the screen 5 of the analyser are arranged in such manner that the image to be transmitted by reflection to the analyser and/or to be recorded on the film is focussed to its maximum sharpness of definition on both the two surfaces 4 and 5.

When the apparatus is in operation, the rotation of the shutter 2 and the forward travel of the film 4 by its mechanism shown diagrammatically by the hook 7, are effected, for example, by a synchronous electric motor 8 coupled mechanically by suitable means, indicated schematically by the arrows 9 and 11 respectively, to the shaft 3 of the shutter and to the travel mechanism 7 for the film 4.

The means for synchronisation of the shutter 2 and the mechanism 7 with the analyzer 6 may be of any known type and are therefore not shown.

When the control-operator who receives the televised images wishes to stop recording on the film 4, he stops the common motor 8, for example by actuating a switch 12 placed on the supply of current 13.

Cinematographic recording is then stopped as is also the travel of the strip which is not unwound uselessly, the television continues to be transmitted, the shutter having been stopped in its reflecting position by any known means (not shown).

Figure 2:
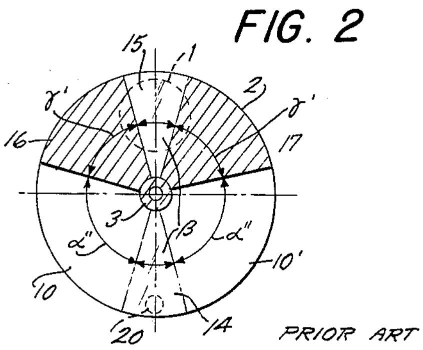
Fig. 2 is a diagram of a shutter of a standard cinematographic camera with an aperture of 180°.

A preferred form of a rotary shutter, known per se, for carrying the invention into effect is shown in Fig. 2.

Two opaque but reflecting sectors 14 and 15 of angular size $\beta$ are arranged in diametrical opposition, but blackened sectors 16 and 17, having angles $\gamma'$, $\gamma'$ are arranged to enclose between them the sector 15, for example, their angles $\gamma'$ being such that they leave transparent sectors 10, 10' of equal aperture angles $\alpha'' \geqq 90°$ between them and the sector 14.

The effective aperture angle of sectors 10, 10' thus remains equal to or greater than 180°, in spite of the passage of sector 14 before the objective 1, dividing the exposure in two, which does not cause any difficulty, the exposure time corresponding to the aperture angle $2\alpha''$. The presence of the sector 14 symmetrically opposite to 16, 15 and 17 permits of an absolute and easy balance by the addition of a weight 20 to the sector 14, on the non-polished side.

With this device, economy in film footage can be effected by stopping the film strip during the scenes which it is not desired to record, but if used in the system of Fig. 1 the illumination of the screen 5 of the television analyser is continuous during these stoppages and is much stronger; it varies with respect to the periods of film recording and this is a very serious drawback for transmission by television.

In addition, each time the shutter 2 is again started-up, the synchronism and the phase agreement of this shutter must be restored with the scanning of the screen 5 of the analyser.

Figure 3:
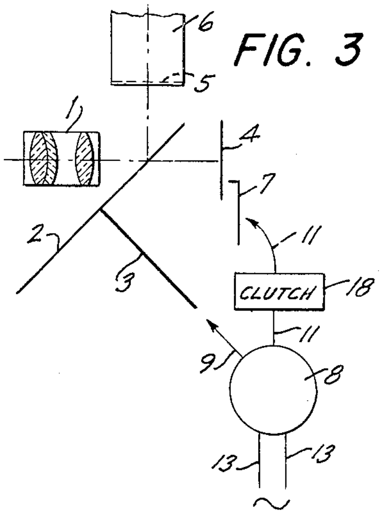
Fig. 3 is a diagram of an arrangement for carrying the invention into effect, which shows the difference between this arrangement and the method which is shown in the diagram of Fig. 1.

In the diagram of Fig. 3 corresponding to the carrying into effect of the invention, the same parts are shown as in the diagrams of Figs. 1 and 2 but: (1) once the device has been started-up, the stopping of the recording is no longer obtained by cutting-off the power supply to stop the motor 8, instead the latter continues to rotate and drives the shutter 2 which remains synchronised and in phase with the analyser 6. (2) Means shown diagrammatically at 18 are interposed between the motor 8 and the film-moving mechanism 7 for interrupting the coupling shown diagrammatically by the arrow 11 and enabling the stoppage or the starting-up of the film, at the will of the control-operator, without varying either the working or the synchronism and the phase agreement of the analyser 6 with the shaft 3 and the shutter 2, which rotate without interruption.

Upon the effective restoration of the coupling 18 between the motor 8, which is still in motion, and the driving mechanism 7 of the film, it will be necessary to bring the motion of the film into phase with the shutter 2 by any known means (not shown) as in the device shown in Fig. 1.

The de-clutching means of the connection between the motor 8 and the driving mechanism shown diagrammatically by the hook 7, may be of any mechanical or electro-mechanical type, for example.

In Fig. 4, there will again be seen the same parts, but the single motor is replaced by two independent synchronous motors 19 and 21.

The motor 19 drives the rotating shutter 2 directly at a suitable speed. The motor 21 drives the operating mechanism 7 of the film 4 with any desired intermediate members.

After starting-up both these motors by connection to the supply source at 13 and 13', the motor 21 can be stopped together with the forward travel of the film 4, by simply breaking its supply circuit by means of a switch 22', operated by the control operator. The motor 19 continues to drive the shutter 2 in phase with the analyser 6.

For the adjustment of the phase agreement during the starting-up period, the motors 19 and 21 have their external stators mounted in bores 22 and 23 respectively, which are concentric with the axes of these motors, and in which bores the stators can be rotated by hand or by any local or distant adjustment device which is locked in any position of adjustment. These bores 22 and 23 are fixed on the frame of the camera.

When starting-up, a rotation 24 of 19 in the bore 22 will enable the exact phasing of the shutter to be obtained by visual control of the television images. The shutter will thus be kept in exact relative phase position and in operation during the entire duration of working of the television analyser.

As illustrated by Figs. 4–6, the positional setting of 21 (19) by its rotation 25 (24) in the bore 23 (22) should be carried out by hand by turning a worm V (V') in engagement with a worm wheel C (C') attached to stator 21 (19) or it can be effected automatically at each resumption of movement of the film.

The control will be effected easily by known means e.g., by contact discs D, D' carrying contacts E, E', respectively, which rotate with the rotors of the motors 19 and 21, respectively, and stationary cooperating contacts F, F', all connected in series with a lamp L in circuit A, said lamp L being lit only when motors 19, 21 are in phase, or any other known phase-meter device which may either show or cause phase agreement between the motor 19 and the driving mechanism 7.

The advantages of the invention are self-evident. An accurately-balanced shutter can be employed which, in the case of two motors used separately as in the example given above, can be free from any vibration.

There is thus provided at the same time a clear cinematographic image at a rate of 25 per second and a televised image at a rate of 50 per second having accurately balanced illumination of the interlaced lines which is not varied when the photography on film is stopped.

For the recording of sound in television the camera is silent because the rotating shutter is directly driven.

Numerous modifications may be made in the means for carrying the system into effect with reference to the examples given by way of illustration and without implied limitation.

In particular, the functions of the shutter of the camera for the downward movement of the film and the synchronised reflections of the image on the screen of the television analyser in the camera may be separated.

There is provided in such case a rotating mirror with an inclined axis having at least one reflecting sector to send the beam on to the screen of the analyser, this rotary mirror giving, with the present standards, 50 reflections per second having a duration adapted to television and, this duration being insufficient to mask the objective during the movement of the cinematographic film, and there is employed simultaneously an ordinary cinematographic shutter combined with the driving mechanism and having its operation synchronised with the rotary mirror of the television.

This rotary mirror may then even comprise only one reflecting sector which will cut-off the beam during the shutter action by the other shutter during the downward movement of the film, the necessary precautions of balance being taken in the case of a single sector.

What is claimed is:

1. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pickup device; drive means including means for imparting a continuous rotation to said rotary beam control means and means for actuating said film transport means; and control means for arbitrarily rendering operative and inoperative said means for actuating said film transport means, whereby the operation of said cinematographic device may be stopped and started at any time while the operation of said television pick-up device is continued without interruption.

2. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pickup device; drive means including motor means for imparting a continuous rotation to said rotary beam control means and clutch means for actuating said film transport means; and control means for arbitrarily rendering operative and inoperative said clutch means for actuating said film transport means, whereby the operation of said cinematographic device may be stopped and started at any time while the operation of said television pick-up device is continued without interruption.

3. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pickup device; drive means including first motor means for imparting a continuous rotation to said rotary beam control means and second motor means for actuating said film transport means; and control means for arbitrarily rendering operative and inoperative said second motor means for actuating said film transport means, whereby the operation of said cinematographic device may be stopped and started at any time while the operation of said television pick-up device is continued without interruption.

4. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pickup device; drive means including first synchronous motor means for imparting a continuous rotation to said rotary beam control means and second synchronous motor means for actuating said film transport means; and control means for arbitrarily rendering operative and inoperative said second synchronous motor means for actuating said film transport means, whereby the operation of said cinematographic device may be stopped and started at any time while the operation of said television pick-up device is continued without interruption.

5. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pickup device; drive means including first synchronous motor means for imparting a continuous rotation to said rotary beam control means and second synchronous motor means for actuating said film transport means, said drive means further including means for phasing said first and second motor means with respect to each other; and control means for arbitrarily rendering operative and inoperative said second synchronous motor means for actuating said film transport means, whereby the operation of said cinematographic device may be stopped and started at any time while the operation of said television pick-up device is continued without interruption.

6. A system as claimed in claim 5, wherein said motor means include housing means and stator means mounted in said housing means rotatably about the motor axis, and wherein said phasing means include means for rotating said stator means into angular positions determining the desired phase relationship.

7. A system as claimed in claim 5, wherein said phasing means include phase indicator means capable of indicating whether said first and second motor means are operating in phase with each other.

8. In a combined television pickup and cinematography system, in combination, a television pickup device having a photosensitive screen; a cinematographic device including a film transport means adapted to move consecutive portions of an unexposed film strip stepwise into picture receiving position in a predetermined plane; objective means positioned for focusing image carrying beams of light on said portions of said film strip in picture receiving position in said predetermined plane; rotary beam control means interposed between said objective means and said predetermined plane, and capable of periodically interrupting said beam of light focused on said film strip portions, said rotary beam control means including reflector means for periodically diverting said beam of light to said photosensitive screen of said television pick-up device; drive means including first synchronous motor means for imparting a continuous rotation to said rotary beam control means and second synchronous motor means for actuating said film transport means; and switch means for arbitrarily rendering operative and inoperative said second synchronous motor means for actuating said film transport means, whereby the operation of said cinematographic device may be stopped and started at any time while the operation of said television pick-up device is continued without interruption.

References Cited in the file of this patent

UNITED STATES PATENTS

| | | |
|---|---|---|
| 2,420,197 | Rosenthal | May 6, 1947 |
| 2,771,814 | Isom | Nov. 27, 1956 |

FOREIGN PATENTS

| | | |
|---|---|---|
| 876,024 | France | July 13, 1942 |
| 936,186 | France | Feb. 16, 1948 |